United States Patent
Loving et al.

(10) Patent No.: US 7,456,746 B2
(45) Date of Patent: Nov. 25, 2008

(54) QUARTER WAVE PHASE SHIFTED DIODE DETECTOR CIRCUIT

(75) Inventors: Sean T. Loving, Lafayette, CO (US); Sayan Chakraborty, Lakewood, CO (US); Tim Enwall, Boulder, CO (US); Christopher Chan, Erie, CO (US); Lee Snook, Golden, CO (US); Rohit Majhi, Boulder, CO (US)

(73) Assignee: SkyeTek, Inc., Westminster, CO (US)

( * ) Notice: Subject to any disclaimer, the term of this patent is extended or adjusted under 35 U.S.C. 154(b) by 291 days.

(21) Appl. No.: 11/513,667

(22) Filed: Aug. 31, 2006

(65) Prior Publication Data

US 2007/0182558 A1   Aug. 9, 2007

Related U.S. Application Data

(60) Provisional application No. 60/712,957, filed on Aug. 31, 2005.

(51) Int. Cl.
*G08B 13/14* (2006.01)
(52) U.S. Cl. .................... 340/572.4; 340/572.7
(58) Field of Classification Search ... 340/572.1–572.9, 340/10.3, 10.33, 10.34; 235/435, 436, 439, 235/449–450, 451
See application file for complete search history.

(56) References Cited

U.S. PATENT DOCUMENTS

| | | | |
|---|---|---|---|
| 3,842,350 A | 10/1974 | Gross | |
| 4,093,919 A * | 6/1978 | Watanabe | .................... 455/142 |
| 5,013,898 A | 5/1991 | Glasspool | |
| 5,455,575 A | 10/1995 | Schuermann | |
| 5,519,381 A | 5/1996 | Marsh et al. | |
| 5,745,037 A | 4/1998 | Guthrie et al. | |
| 5,751,220 A | 5/1998 | Ghaffari | |
| 5,777,561 A | 7/1998 | Chieu et al. | |
| 5,887,176 A | 3/1999 | Griffith et al. | |
| 5,920,261 A | 7/1999 | Hughes et al. | |

(Continued)

FOREIGN PATENT DOCUMENTS

JP   2002288598   10/2002

(Continued)

OTHER PUBLICATIONS

U.S. Appl. No. 11/301,770; Office Action mailed Jun. 6, 2008; 10 pages.

(Continued)

*Primary Examiner*—George A Bugg
*Assistant Examiner*—Jennifer Mehmood
(74) *Attorney, Agent, or Firm*—Lathrop & Gage LC

(57) ABSTRACT

A phase shifting diode detector system for an RFID reader. Quarter-wave delay circuitry is coupled between a forward transmitted signal of the RFID reader applied at a first end of the delay circuitry, and a reflected signal returning from an RFID tag applied at a second end of the delay circuitry. The system includes a pair of diode detector bridges, each comprising a series-coupled diode pair configured such that diode polarities in each bridge are reversed relative to the output thereof, to produce opposite rectified signal output polarities. An input to each of the bridges is capacitively coupled, from the junction between each said diode pair, to a respective opposite end of the delay circuitry.

20 Claims, 3 Drawing Sheets

U.S. PATENT DOCUMENTS

| | | | |
|---|---|---|---|
| 5,929,779 | A | 7/1999 | MacLellan et al. |
| 5,952,922 | A | 9/1999 | Shober |
| 6,078,251 | A | 6/2000 | Landt et al. |
| 6,161,724 | A * | 12/2000 | Blacker et al. ............... 222/23 |
| 6,182,214 | B1 | 1/2001 | Hardjono |
| 6,192,222 | B1 | 2/2001 | Greeff et al. |
| 6,259,367 | B1 | 7/2001 | Klein |
| 6,304,613 | B1 | 10/2001 | Koller et al. |
| 6,317,027 | B1 | 11/2001 | Watkins |
| 6,377,176 | B1 | 4/2002 | Lee |
| 6,420,961 | B1 | 7/2002 | Bates et al. |
| 6,483,427 | B1 | 11/2002 | Werb |
| 6,496,806 | B1 | 12/2002 | Horwitz et al. |
| 6,509,828 | B2 | 1/2003 | Bolavage et al. |
| 6,531,957 | B1 | 3/2003 | Nysen |
| 6,539,422 | B1 | 3/2003 | Hunt et al. |
| 6,617,962 | B1 | 9/2003 | Horwitz et al. |
| 6,677,852 | B1 | 1/2004 | Landt |
| 6,717,516 | B2 | 4/2004 | Bridgelall |
| 6,903,656 | B1 | 6/2005 | Lee |
| 6,992,567 | B2 | 1/2006 | Cole et al. |
| 7,026,935 | B2 | 4/2006 | Diorio et al. |
| 7,197,279 | B2 | 3/2007 | Bellantoni |
| 7,375,616 | B2 | 5/2007 | Rowse et al. |
| 7,378,967 | B2 | 5/2008 | Sullivan |
| 2002/0036569 | A1 | 3/2002 | Martin |
| 2002/0131595 | A1 | 9/2002 | Ueda et al. |
| 2003/0007473 | A1 | 1/2003 | Strong et al. |
| 2003/0055667 | A1 | 3/2003 | Sgambaro et al. |
| 2003/0081785 | A1 | 5/2003 | Boneh et al. |
| 2003/0173403 | A1 | 9/2003 | Vogler |
| 2004/0069852 | A1 | 4/2004 | Seppinen et al. |
| 2004/0087273 | A1 | 5/2004 | Perttila et al. |
| 2004/0089707 | A1 | 5/2004 | Cortina et al. |
| 2004/0176032 | A1 | 9/2004 | Kotola et al. |
| 2004/0179684 | A1 | 9/2004 | Appenzeller et al. |
| 2004/0212493 | A1 | 10/2004 | Stilp |
| 2004/0232220 | A1 | 11/2004 | Beenau et al. |
| 2005/0036620 | A1 | 2/2005 | Casden et al. |
| 2005/0063004 | A1 | 3/2005 | Silverbrook |
| 2005/0088299 | A1 | 4/2005 | Bandy et al. |
| 2005/0105600 | A1 | 5/2005 | Culum et al. |
| 2005/0116813 | A1 | 6/2005 | Raskar |
| 2006/0022815 | A1 | 2/2006 | Fischer et al. |
| 2006/0038659 | A1 | 2/2006 | Takano et al. |
| 2007/0001813 | A1 | 1/2007 | Maguire et al. |
| 2007/0008132 | A1 * | 1/2007 | Bellantoni ............... 340/572.1 |
| 2007/0024424 | A1 | 2/2007 | Powell |
| 2007/0205871 | A1 | 9/2007 | Posamentier |
| 2008/0143482 | A1 | 6/2008 | Shoarinejad et al. |
| 2008/0143485 | A1 | 6/2008 | Frerking |

FOREIGN PATENT DOCUMENTS

| | | |
|---|---|---|
| WO | WO 2004/047000 | 6/2004 |
| WO | WO2006123316 | 11/2006 |
| WO | WO/2007/094868 | 8/2007 |
| WO | WO/2008/027650 | 3/2008 |

OTHER PUBLICATIONS

U.S. Appl. No. 11/409,463 Office Action Mailed Jun. 27, 2008; 5 pages.

U.S. Appl. No. 11/301,423 Office Action Mailed Jun. 26, 2008; 12 pages.

U.S. Appl. No. 11/323,214 Office Action mailed Jun. 27, 2008; 13 pages.

U.S. Appl. No. 11/408,652; Restriction Requirement mailed Apr. 28, 2008; 11 pages.

U.S. Appl. No. 11/408,652; Response to Restriction Requirement filed May 28, 2008; 8 pages.

U.S. Appl. No. 11/387,422; Office Action mailed Office Action mailed Jun. 16, 2008; 8 pages.

U.S. Appl. No. 11/301,396; Office Action mailed Office Action mailed Jun. 26, 2008; 9 pages.

PCT/US06/015092 International Search Report & Written Opinion mailed Aug. 23, 2007.

PCT/US06/015092 International Preliminary Report on Patentability; Oct. 23, 2007.

PCT/US06/015093 International Search Report & Written Opinion mailed Feb. 22, 2007.

PCT/US06/015093 International Preliminary Report on Patentability; Oct. 23, 2007.

PCT/US06/015342 International Search Report & Written Opinion mailed Jul. 6, 2007.

PCT/US06/015342; International Preliminary Report on Patentability; Oct. 24, 2007.

PCT/US06/015343 International Search Report & Written Opinion mailed Nov. 13, 2006.

PCT/US06/015343; International Preliminary Report on Patentability; Oct. 24, 2007.

PCT/US06/015344 International Search Report & Written Opinion mailed Oct. 4, 2006.

PCT/US06/015344 International Preliminary Report on Patentability; Oct. 24, 2007.

PCT/US06/015347 International Search Report & Written Opinion mailed Sep. 28, 2006.

PCT/US06/015347 International Preliminary Report on Patentability; Oct. 24, 2007.

PCT/US06/027164 International Search Report & Written Opinion mailed Oct. 26, 2007.

PCT/US06/027164 International Preliminary Report on Patentability; Mar. 4, 2008.

PCT/US06/034023 International Search Report & Written Opinion mailed Aug. 10, 2007.

PCT/US06/034023 International Preliminary Report on Patentability; Mar. 4, 2008.

PCT/US06/26933 International Search Report & Written Opinion mailed Dec. 20, 2007.

Gagne, Martin, "Identity-Based Encryption: a Survey," Cryptobytes—the Technical Newsletter of RSA Laboratories, Spring 2003.

Gemmell, Peter, "An Introduction to Threshold Cryptography," Cryptobytes—the Technical Newsletter of RSA Laboratories, Winter 1997.

Shamir, Adi, "How to Share a Secret," Communications of the ACM, vol. 22 Issue 11 (Nov. 1979).

Shamir, Adi, "Identity-Based Cryptosystems and Signature Schemes," Proceedings of Crypto '84, pp. 47-53.

Schneier, Bruce, Applied Cryptography, 2nd Edition, Wiley and Sons, 1996, pp. 71-73 and 528-531.

Microsoft Corporation, "Description of the Secure Sockets Layer (SSL) Handshake," Article ID: 257591, Jun, 23, 2005.

U.S. Appl. No. 11/301,770, Response to Office Action filed Sep. 5, 2008, 3 pages.

U.S. Application No. 11/301,587, Office Action Mailed Sep. 16, 2008, 11 pages.

U.S. Application No. 11/301,423, Response to Office action filed Sep. 9, 2006, 2008, 4 pages.

U.S. Appl. No. 11/301,396, Response to Office Action filed Sep. 26, 2008, 5 pages.

U.S. Appl. No. 11/408,652, Office Action mailed Oct. 1, 2008, 9 pages.

PCT/US06/015094, International Search Report & Written Opinion mailed Sep. 22, 2008, 10 pages.

European Application No. 08001003 Search Report Aug. 7, 2008, 5 pages.

European Application EP 08011298.0 Search Report, Sep. 19, 2008, 6 pages.

* cited by examiner

QUARTER WAVE PHASE SHIFTED DIODE DETECTOR CIRCUIT

RELATED APPLICATIONS

This application claims benefit of U.S. provisional patent application Ser. No. 60/712,957, filed Aug. 31, 2005, entitled "RFID Systems And Methods", the disclosure of which is hereby incorporated by reference.

BACKGROUND

RFID stands for Radio-Frequency IDentification. An RFID transponder, or 'tag', serves a similar purpose as a bar code or a magnetic strip on the back of a credit card; it provides an identifier for a particular object, although, unlike a barcode or magnetic strip, some tags support being written to. An RFID system carries data in these tags, and retrieves data from the tags wirelessly. Data within a tag may provide identification for an item in manufacture, goods in transit, a location, the identity of a vehicle, an animal, or an individual. By including additional data, the ability is provided for supporting applications through item-specific information or instructions available upon reading the tag.

A basic RFID system comprises a reader, including an interrogator module (transmitter) and a closely-coupled reader (receiver) module (a transceiver is often used), and a transponder (an RFID tag) electronically programmed with unique identifying information. Both the reader/interrogator and transponder have antennas, which respectively emit and receive radio signals to activate the tag, read data from the tag, and write data to it.

The interrogator module in the reader emits an RF activation signal with a range of anywhere from one inch to 100 feet or more, depending upon the interrogator's power output and the radio frequency used. The RF signal from the interrogator provides power to operate a 'passive' tag's integrated circuit or microprocessor and associated memory.

In a tag-read situation, when an RFID tag passes through the electromagnetic zone created by the interrogator (i.e., when the tag is 'in-field'), it detects the activation signal, upon which the tag conveys its stored data to the reader module, using power provided by the interrogator. The reader decodes the data received from the tag's integrated circuit and the decoded data may be processed by the reader, or passed to another device (e.g., a computer) for processing.

In a tag-write situation, when an RFID tag is 'in-field', it detects the interrogator's activation signal, upon which the tag transfers data sent from either the interrogator or the reader module to the tag's internal memory, again using power harvested from the transmit signal to power the tag to process the command and provide a response.

Problem to be Solved

Several problems with previous RFID readers exist, including insufficient sensitivity to signals from RFID tags, and the number of separate circuits required to perform various reader functions including tag signal envelope detection, battery level detection, feedback control of RF power, temperature compensation, and load/backscatter modulation.

All known previous methods need an entire subcircuit comprised of multiple discrete components for each of these functions. Previous methods to improve RFID reader sensitivity also require additional expensive filtering, low-noise amplifiers, costly circulators, and/or multiple antennas.

SOLUTION TO THE PROBLEM

The phase shifter/diode detector system front-end, in several embodiments, achieves 6 dBm gain in receive sensitivity, and cancels amplitude-modulated (AM) noise. The present system employs two diode detector bridges, coupled to a phase shifting component (phase delay circuitry) that provides a one quarter-wave phase shift in both a forward path input from the reader's transmitter and a signal received (reflected) from an RFID transponder (an 'RFID tag').

Each of the two-diode detector bridges rectifies the high power carrier amplitude signal received from the RFID reader's transmitter. The output voltages from these diode pairs are in proportion to, but opposite in polarity from, the envelope of the transmitter carrier. The opposing voltages are mixed and input to a summing amplifier, thereby significantly reducing the amplitude noise component.

When two sine waves of equal frequency are multiplied, the result is a DC component and a waveform of twice the frequency. The DC component is a function of the phase difference between the two sine waves. The transmitted sine wave enters the quarter wave delay line or delay circuitry) at one end and the received sine wave enters from the opposite end. Both wave fronts produce voltages at that are shifted 90 degrees. The non-linear action of the diodes produces the multiplication resulting in the DC component at diode outputs. Because of the phase shift and the reversal of the diodes, the DC voltages are of the same polarity and are added in the summing amplifier. This results in a doubling of the signal amplitude.

DETAILED DESCRIPTION

Figure 1:
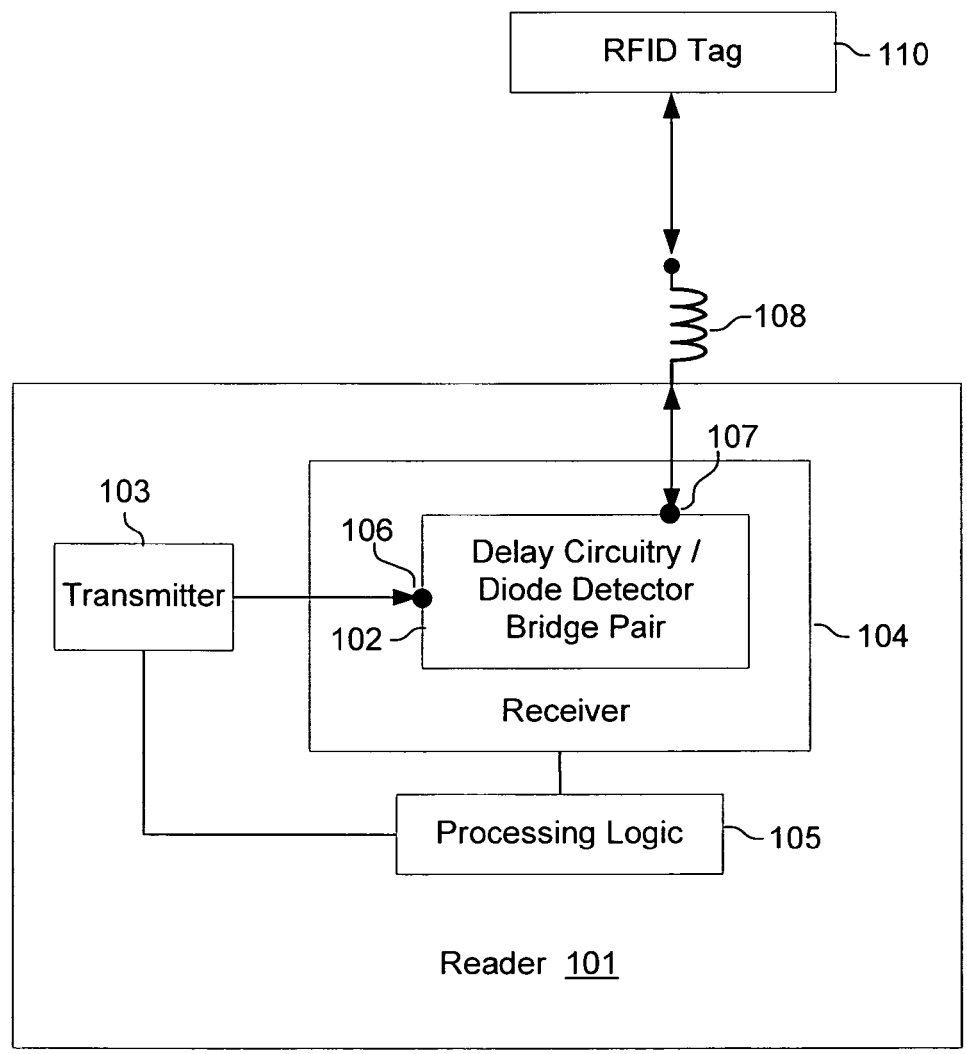
FIG. 1 is a diagram of an exemplary embodiment of an RFID reader in accordance with the present system, showing typical components included therein.
Figure 2:
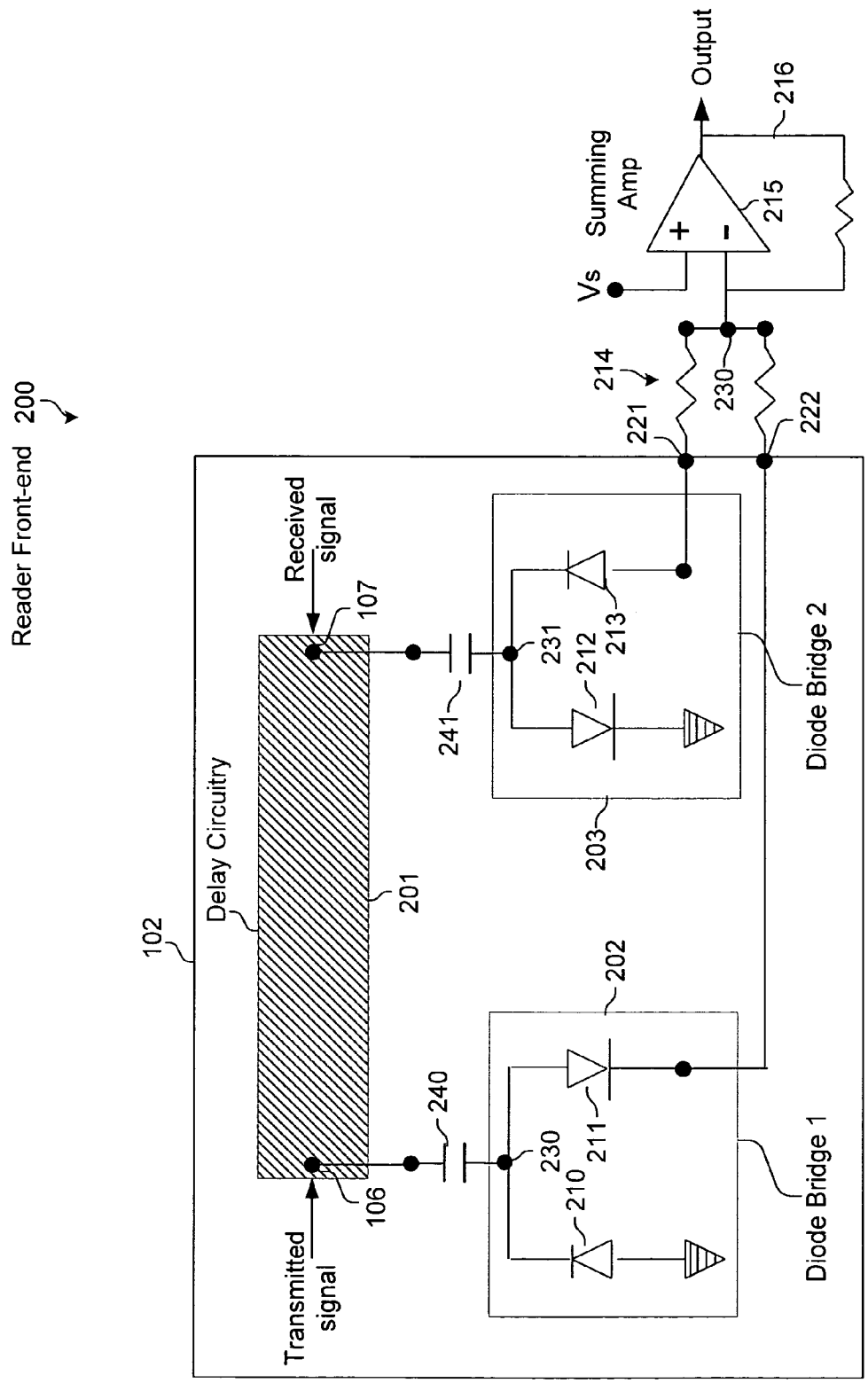
FIG. 2 s a diagram showing exemplary system components included in one embodiment of the present RFID reader front-end.

FIG. 1 is a diagram of an exemplary embodiment of an RFID reader 101 including a phase shifter/diode detector circuit 100 employed as the front-end of the reader (shown in greater detail in FIG. 2). Two functional techniques are included in the design of the present RFID reader front-end. A first one of these techniques includes forward path amplitude noise cancellation from the transmitter, which results in increased signal to noise ratio by canceling Amplitude Modulation (AM) noise present on the envelope of the transmit carrier. The second of these techniques includes reverse path signal phase addition, which doubles the signal to noise ratio of the mixed signal at the output of the detector diodes feeding the summing amplifier. The combination of these two functions significantly improves the signal to noise ratio of the detector circuit.

As shown in FIG. 1, RFID reader 101 includes a transmitter 103 coupled to a receiver 104, both of which are controlled by processing logic 105. Receiver 105 includes delay circuitry/diode detector bridge pair 102, which is shown in greater detail in FIG. 2. Transmitter 103 is coupled to one end 106 of the delay circuitry, and an antenna 108 is coupled to the other end 107 of the delay circuitry. Reader 101 is used for communicating with RFID tag 110.

FIG. 2 is a diagram showing exemplary system components included in one embodiment 200 of the present RFID reader front-end 200. The present system employs an all-pass discrete design (hereinafter referred to as 'delay circuitry') 201 and a two-diode detector bridge pair 202/203. In an exemplary embodiment, the phase shifter comprises a 'Tee' network including two inductors and one capacitor (as described below with respect to FIG. 3). Alternatively, delay circuitry 201 may consist of a cable whose length is such that it provides a quarter-wave delay at the desired transmit/receive frequency.

Each of the detector bridges 202/203 includes two series-coupled diodes 210/2111 and 212/213. In one embodiment, the diodes 210-213 are, for example, Phillips HSMS282 diodes. Each bridge 202/203 is capacitively coupled (via capacitors 240/241) to one end of the delay circuitry 201 at the junction 230/231 of the particular diode pair. The output 221/222 of each diode detector bridge 202/203 is coupled to the negative input of a summing amplifier 215 via a resistor network 214. Summing amplifier 215 receives a voltage Vs at the amplifier's positive input and a feedback loop 216 is used between the amplifier's output and negative input.

Each of the two-diode detector bridges 202/203 rectifies the high power carrier amplitude signal from the transmitter and the lower power backscatter signal from an RFID tag, at delay circuitry input 107. The output voltages from these diode pairs are in proportion to, but opposite in polarity from, the envelope of the transmitter carrier mixed with the returning backscatter carrier). The opposing voltages are added by the summing amplifier, thereby canceling the amplitude noise component.

The diode detector bridges are separated, via delay circuitry 201, in the circuit by one quarter-wave. A sine wave is present on each end 106/107 of the delay circuitry 201. One of the sine waves is the forward or transmit signal (typically 910 Mhz) and the other is the reflected sine wave of the same frequency but delayed phase returning from the reader antenna 108. When two sine waves of equal frequency are multiplied, the result is a DC component and a waveform of twice the frequency. The DC component is a function of the phase difference between the two sine waves. The transmitted sine wave enters delay circuitry 201 (which is, in effect, a quarter wave transmission line) at one end 106 and the received sine wave enters from the opposite end 107. Both wave fronts produce voltages at that are shifted 90 degrees at the RF carrier frequency. The mixing of these signals in the non-linear diodes produces modulated signals of opposite polarities resulting in multiplication the DC component at the diode outputs. Because of the phase shift and the reversal of the diodes' polarity, the DC voltages are of the same polarity and are added in the summing amplifier. This results in a doubling of the signal amplitude.

In one embodiment, a typical center of the frequency band employed by reader 101 is approximately 900 MHz (more specifically, in one particular embodiment, the frequency band extends from 860 to 960 Mhz with 910 Mhz being the center of the band). The time delay required to achieve a 90 degree phase shift at ~900 MHz is equal to one-quarter cycle of a 900 MHz sine wave, which equals 1.0989 nanoseconds divided by 4, yielding a delay of $2.747 \times 10^{\wedge} -10$ seconds or 2747 picoseconds.

Therefore, the time delay for a 90 degree phase shift is considerable portion of the 910 MHz carrier signal, but a very small portion of the cycle for a lower frequency such as the noise modulation of the envelope of the 910 MHz carrier. The noise amplitude modulation frequencies, i.e., noise frequencies riding on the envelope of the carrier, are, in contrast, typically less than 100 kHz.

Thus, given a 100 kHz noise bandwidth, the Lambda value for a 100 kHz signal=1/100 kHz=10 μsec to complete 360 degrees. Therefore the delay at 100 kHz=(2747 ps/10 μsec)× 360=0.00988 degrees, which is a quite minimal phase shift, relative to the quarter-wave (90 degrees) phase shift imparted by the delay circuitry to the 910 MHz signal. Therefore, the phase-shifting delay circuitry causes the carrier signal to be delayed by a quarter-cycle, while the envelope is only very slightly delayed relative to its wavelength. This quarter-cycle delay increases the amplitude of the mixed signal (i.e., the summed signal {or should this be "difference signal"?} at the output 230 of the diode pairs) at the summing amplifier 215 by a factor of two, and is explained as follows.

In operation of the present system, a signal y1 (t) is applied to one end (e.g., the transmit end) 106 of delay circuitry 210, and a signal y2(t) is applied to at the other end of 107 the delay circuitry (in this example, the reflected/received signal end). The detector diode polarities in each diode bridge 202/203 are reversed at each end 106/107 of the delay line (delay circuitry) 201 products. Since the diode detector outputs are reversed, the mixing of these signals in the non linear diode devices produces modulated signals of opposite polarities (at points 221/222). A polarity reversal of the input signal results in subtraction of the signals at the output 230 of the diode detector pairs, resulting in a DC component of the output voltage equal to twice the amplitude of the individual detector outputs.

Therefore, the signal at the output 230 of the diode detector bridge pairs 202 and 203 is:

$$y(t)=y1(t)-y1(t)$$

For example, given a signal y1 (t) at one end of the delay line 201 with a DC offset of 0.5 volts, and a signal y2(t) at the other end of the delay line with a DC offset of −0.5 volts, then:

$$y(t)=0.5v-(-0.5v); =1.0v$$

Thus the DC component of the output voltage has been multiplied by a factor of two, relative to the amplitude of the individual detector outputs. This signal multiplication is the result of the fact that the diodes 210-213 are non linear devices which, in effect, multiply the two input signals.

Multiplying these signals at each end of the delay line 201 generates two positive DC voltages at input 230 of the summing amplifier 215 thereby doubling the amplitude of the DC signal. This DC value is a function of the phase differences between the forward and reverse signals.

The noise on the amplitude modulated (AM) part of the input signal is of a much lower frequency than the carrier signal, and as mentioned previously, is delayed relatively insignificantly. Therefore, because of the reverse polarity configuration, the rectified DC voltage out of the diode detectors is of the opposite polarity. The summing amplifier adds the two voltages to zero, thus effectively eliminating the AM noise in the signal present on the envelope of the transmit carrier.

Figure 3:
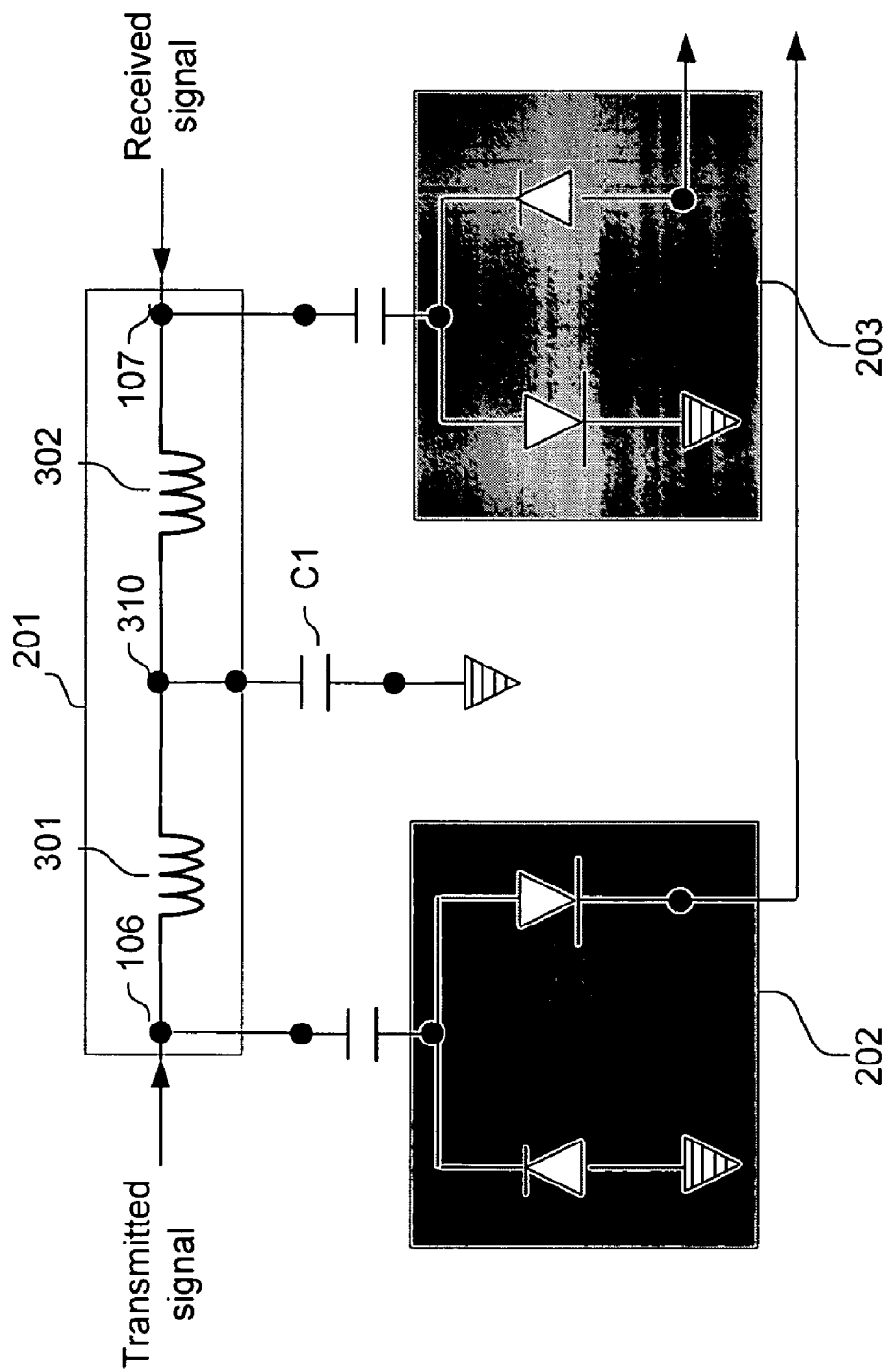
FIG. 3 is a diagram showing a more specific configuration of the system delay circuitry.

FIG. 3 is a diagram showing a more specific configuration of the system delay circuitry 201. In the embodiment shown in FIG. 3, delay circuitry 201 comprises two series-coupled inductors 301/302, with one end 106 of inductor 301 capacitively coupled to diode detector bridge 202, and one end 107 of inductor 302 capacitively coupled to bridge 203. Center tap 310 between inductors 301 and 302 is coupled to ground through capacitor C1. In one embodiment employing a 910

MHz center signal, inductors 301 and 302 have values of approximately 6.8 nh and capacitor C1 has a value of approximately 3.3 pf.

Certain changes may be made in the above methods and systems without departing from the scope of that which is described herein. It is to be noted that all matter contained in the above description or shown in the accompanying drawings is to be interpreted as illustrative and not in a limiting sense. For example, the systems shown in FIGS. 1-3 may include different components than those shown in the drawings. The elements and steps shown in the present drawings may be modified in accordance with the methods described herein, and the steps shown therein may be sequenced in other configurations without departing from the spirit of the system thus described. The following claims are intended to cover all generic and specific features described herein, as well as all statements of the scope of the present method, system and structure, which, as a matter of language, might be said to fall there between.

What is claimed is:

1. A phase shifting diode detector system for an RFID reader comprising:
   quarter-wave delay circuitry coupled between a forward transmitted signal of the RFID reader applied at a first end of the delay circuitry, and a reflected signal returning from an RFID tag applied at a second end of the delay circuitry; and
   a pair of diode detector bridges, each comprising a series-coupled diode pair configured such that diode polarities in each bridge are reversed relative to the output of the diode pair, to produce opposite rectified signal output polarities;
   wherein an input to each of the bridges is capacitively coupled, from the junction between each said diode pair, to a respective opposite end of the delay circuitry.

2. The diode detector system of claim 1, wherein one end of each diode pair is coupled to ground, and the other end of each diode pair is the signal output.

3. The diode detector system of claim 1, wherein polarity reversal of the input signal results in subtraction of the signals at the output of the diode detector pairs, resulting in a DC component of the output voltage equal to twice the amplitude of the individual detector outputs.

4. The diode detector system of claim 1, wherein each of the two-diode bridges rectifies the transmitted signal amplitude modulated signal to generate rectified output voltages that are in proportion to, and opposite in polarity from, an envelope of the transmitted signal, wherein the output voltages are mixed to essentially cancel an amplitude noise component of the transmitted signal.

5. The diode detector system of claim 1, including a summing amplifier coupled to the outputs of the diode detector bridges, wherein the summing amplifier adds the two output voltages to zero, thus significantly reducing the AM noise in the signal in the detector outputs.

6. The diode detector system of claim 1, wherein the quarter-wave delay circuitry comprises two series-coupled inductors, with one end of a first inductor capacitively coupled to a first one of the detector bridges, and one end of the second inductor capacitively coupled to a second one of the detector bridges, and wherein a center tap between the inductors is capacitively coupled to ground.

7. The diode detector system of claim 1, wherein the quarter-wave delay circuitry comprises a delay line in the form of a cable whose length is such that it provides a quarter-wave delay at a transmit/receive frequency of the RFID reader.

8. A phase shifting diode detector system for an RFID reader comprising:
   quarter-wave delay circuitry coupled between a forward transmitted signal of the RFID reader applied at a first end of the delay circuitry, and a reflected signal returning from an RFID tag applied at a second end of the delay circuitry; and
   a pair of diode detector bridges, each comprising a series-coupled diode pair configured such that diode polarities in each bridge are reversed relative to the output of the diode pair, at a first end of each diode pair, to produce opposite rectified signal output polarities, and wherein the second end of each diode pair is coupled to ground;
   wherein the input to a first one of the bridges is capacitively coupled to the first end of the delay circuitry, and the input to the second one of the bridges is capacitively coupled to the second end of the delay circuitry, wherein the input to each of the bridges is connected to the junction between each said diode pair.

9. The diode detector system of claim 8, wherein each of the two-diode bridges rectifies the transmitted signal's amplitude modulated signal to generate rectified output voltages that are in proportion to, and opposite in polarity from, an envelope of the transmitted signal, wherein the output voltages summed by a summing amplifier cancel an amplitude noise component of the amplitude modulated signal.

10. The diode detector system of claim 8, wherein polarity reversal of the input signal results in addition of the signals at the output of the diode detector pairs, resulting in a DC component of the output voltage equal to twice the amplitude of the individual detector outputs.

11. The diode detector system of claim 8, wherein the quarter-wave delay circuitry comprises two series-coupled inductors, with one end of a first inductor capacitively coupled to a first one of the detector bridges, and one end of the second inductor capacitively coupled to a second one of the detector bridges, and wherein a center tap between the inductors is capacitively coupled to ground.

12. The diode detector system of claim 8, wherein the quarter-wave delay circuitry comprises a delay line in the form of a cable whose length is such that it provides a quarter-wave delay at a transmit/receive frequency of the RFID reader.

13. A phase shifting diode detector system for an RFID reader comprising:
   quarter-wave delay circuitry coupled between a forward transmitted sine wave signal of the RFID reader applied at a first end of the delay circuitry, and a reflected sine wave signal returning from an RFID tag applied at a second end of the delay circuitry; and
   a pair of diode detector bridges, each comprising a series-coupled diode pair configured such that diode polarities in each bridge are reversed relative to the output of the diode pair, to produce opposite rectified signal output polarities;
   wherein the bridges each have an input, connected to the junction between each said diode pair, capacitively coupled to a respective opposite end of the delay circuitry;
   wherein the transmitted sine wave enters the quarter-wave delay circuitry at one end and the received sine wave enters from the opposite end, causing both wave fronts to produce voltages that are phase-shifted 90 degrees to create two DC voltages are of the same polarity which added in a summing amplifier to double the signal amplitude; and wherein each of the diode detector bridges rectifies the transmitted sine wave amplitude signal to generate rectified output voltages that are in proportion to, and opposite in polarity from, an envelope of the transmitted signal, wherein the output voltages are fed in series to cancel the amplitude noise component of the signal returning from the RFID tag.

14. The diode detector system of claim 13, wherein the quarter-wave delay circuitry comprises two series-coupled inductors, with one end of a first inductor capacitively coupled to a first one of the detector bridges, and one end of the second inductor capacitively coupled to a second one of the detector bridges, and wherein a center tap between the inductors is capacitively coupled to ground.

15. The diode detector system of claim 13, wherein the quarter-wave delay circuitry comprises a delay line in the form of a cable whose length is such that it provides a quarter-wave delay at a transmit/receive frequency of the RFID reader.

16. In an RFID reader, a method for doubling the signal amplitude of, and reducing amplitude noise of, a signal received from an RFID tag, comprising:

coupling quarter-wave delay circuitry between a forward transmitted signal of the RFID reader applied at a first end of a delay circuitry, and the signal received from the RFID tag applied at a second end of the delay circuitry;

capacitively coupling, to a respective opposite end of the delay circuitry, an input to each of a pair of diode detector bridges, wherein each of the bridges comprises a series-coupled diode pair configured such that diode polarities in each bridge are reversed relative to the output of the diode pair, to produce opposite rectified signal output polarities, wherein the input to each of the bridges is coupled to a junction between each diode pair in a respective bridge.

17. The method of claim 16, wherein the quarter-wave delay circuitry comprises two series-coupled inductors, with one end of a first inductor capacitively coupled to a first one of the detector bridges, and one end of the second inductor capacitively coupled to a second one of the detector bridges, and wherein a center tap between the inductors is capacitively coupled to ground.

18. The method of claim 16, wherein the quarter-wave delay circuitry comprises a delay line in the form of a cable whose length is such that it provides a quarter-wave delay at a transmit/receive frequency of the RFID reader.

19. A diode detector system for an RFID reader comprising:

a pair of diode detector bridges, each comprising a series-coupled diode pair configured such that diode polarities in each bridge are reversed relative to the output of the diode pair, to produce modulated signals having opposite rectified signal polarities;

wherein a forward transmitted signal of the RFID reader and a reflected signal returning from an RFID tag are separated by a phase shift of 90 degrees, and are applied to both inputs of the pair of diode detector bridges; and wherein the junction between each said diode pair corresponds to the input in each of the bridges.

20. The diode detector system of claim 19, wherein the modulated signals produced by the pair of diode detector bridges are added by a summing amplifier to cancel the amplitude noise component of the modulated signals input to the amplifier.

* * * * *